(12) United States Patent
Kamikatano et al.

(10) Patent No.: US 8,870,430 B2
(45) Date of Patent: Oct. 28, 2014

(54) DISPLAY APPARATUS AND LIGHTING WINDOW

(75) Inventors: Mitsuru Kamikatano, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/274,912

(22) Filed: Oct. 17, 2011

(65) Prior Publication Data

US 2012/0033442 A1 Feb. 9, 2012

Related U.S. Application Data

(63) Continuation of application No. PCT/JP2010/002886, filed on Apr. 21, 2010.

(30) Foreign Application Priority Data

Apr. 22, 2009 (JP) .................................. 2009-104345

(51) Int. Cl.
| | | |
|---|---|---|
| F21V 7/04 | (2006.01) | |
| F21V 8/00 | (2006.01) | |
| G02B 27/22 | (2006.01) | |
| G09F 19/12 | (2006.01) | |

(52) U.S. Cl.
CPC .......... *G02B 27/2214* (2013.01); *G02B 6/0036* (2013.01); *G02B 6/0055* (2013.01); *G02B 6/0076* (2013.01); *G09F 19/12* (2013.01)
USPC ............ 362/606; 362/618; 362/626; 362/627

(58) Field of Classification Search
USPC .................................. 362/606–607, 617–627
See application file for complete search history.

(56) References Cited

U.S. PATENT DOCUMENTS

| | | | |
|---|---|---|---|
| 6,454,452 B1 * | 9/2002 | Sasagawa et al. ............. | 362/561 |
| 6,486,790 B1 * | 11/2002 | Perlo et al. ............... | 340/815.45 |
| 2006/0262376 A1 * | 11/2006 | Mather et al. ................. | 359/248 |
| 2008/0285306 A1 | 11/2008 | Sugihara et al. | |

FOREIGN PATENT DOCUMENTS

| | | |
|---|---|---|
| CN | 1856720 A | 11/2006 |
| CN | 1866112 A | 11/2006 |
| CN | 1971369 A | 5/2007 |
| CN | 101290428 A | 10/2008 |
| CN | 101408673 A | 4/2009 |
| JP | 2000-148054 A | 5/2000 |
| JP | 2001-066547 A | 3/2001 |
| JP | 2002-289020 A | 10/2002 |
| JP | 2003-295117 A | 10/2003 |
| JP | 2008-275922 A | 11/2008 |
| WO | 2006/001383 A1 | 1/2006 |

OTHER PUBLICATIONS

Office Action issued by Chinese Patent Office in Chinese Application No. 201080016435.5 dated May 31, 2013.

\* cited by examiner

*Primary Examiner* — Jason Moon Han
(74) *Attorney, Agent, or Firm* — Sughrue Mion, PLLC (57) ABSTRACT

A display apparatus includes a transparent light guide plate, a light source provided on at least one end surface of the light guide plate, and a mask provided on a front surface of the light guide plate. The light guide plate is formed of a plurality of reflecting and scattering portions having reflecting and scattering surfaces that reflect a light emitted from the light source and emit the reflected light from a front surface side. The mask allows an observer to visually recognize the light reflected from a reflective portion for the right eye, using the right eye, and the light reflected from a reflective portion for the left eye, using the left eye, whereby the reflected light beams can be stereoscopically recognized due to binocular parallax.

7 Claims, 10 Drawing Sheets

DISPLAY APPARATUS AND LIGHTING WINDOW

CROSS-REFERENCE TO RELATED APPLICATION

This is a Continuation Application of International Application No. PCT/JP2010/002886, filed on Apr. 21, 2010, which claims priority to Japanese Patent Application No. 2009-104345 filed on Apr. 22, 2009. The contents of the aforementioned applications are incorporated herein by reference.

BACKGROUND OF THE INVENTION

1. Field of the Invention

The present invention relates to a display apparatus used for a display or the like, and particularly, to a display apparatus and a lighting window that allow stereoscopic viewing.

2. Description of the Related Art

As a technique for viewing an image displayed on a plane with the naked eye, and recognizing the image as a stereoscopic image, a system termed parallax barrier is known.

In a display apparatus that adopts this system, generally, an image for the right eye and an image for the left eye are alternately arranged in the shape of a strip so that the image can be seen through a mask in which a plurality of slit-shaped openings is formed, thereby allowing stereoscopic viewing (see Patent Document 1).

Figure 14:
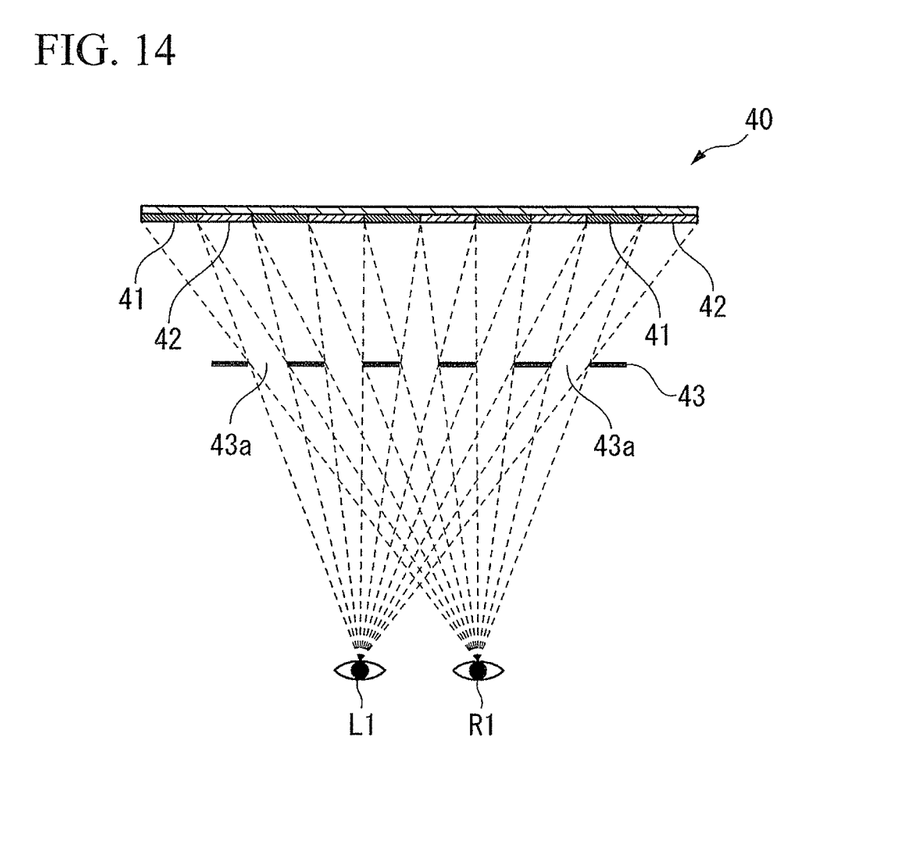
FIG. 14 is a configuration diagram schematically showing an example of the display apparatus.

FIG. 14 shows an example of a display apparatus of the parallax barrier system. In the display apparatus 40, an image 41 for the right eye and an image 42 for the left eye that are alternately arranged are observed through openings 43a of a mask 43, using the observer's right eye R1 and left eye L1, respectively. Thereby, the image 41 for the right eye and the image 42 for the left eye are recognized as a stereoscopic image.

As a display apparatus that allows stereoscopic viewing, instead of the mask 43, there is also a display apparatus of a so-called lens array system using a lens array in which tiny lenses are aligned at regular pitches.

PATENT DOCUMENTS

[Patent Document 1] Japanese Unexamined Patent Application, First Publication No. 2003-295117

However, in a general display apparatus of a parallax barrier system, the aperture ratio of the openings 43a of the mask 43 is small (usually 30% or less). Therefore, in securing the brightness of display, the adoption of an external light is difficult, and internal light, such as a backlight, is usually adopted. However, even in this case, it is difficult to obtain sufficient brightness. Additionally, when an internal light is adopted, there is also a problem in that the thickness of the overall display apparatus also increases.

Additionally, although the internal light is not usually needed in the lens array system, a backlight or an external light is adopted when the display, for example, at night is not easily seen. In that case, there is a problem in that a space for lighting is needed in front of or behind the display apparatus, and the thickness increases too.

The present invention has been made in view of the above circumstances, and an object thereof is to provide a display apparatus and a lighting window that can obtain display of sufficient brightness and that can realize a lower profile.

SUMMARY

A display apparatus of the present invention includes a transparent light guide plate; at least one light source provided on at least one end surface of the light guide plate; and a mask or a lens array as a parallax barrier provided on one surface side of the light guide plate. The light guide plate is formed of a plurality of reflecting and scattering portions having reflecting and scattering surfaces that reflect and scatter a light from the light source that is incident from the end surface and emit the reflected light from the one surface side.

Preferably, the reflecting and scattering portion may be a concave portion, a convex portion, or a combination thereof that is formed in the light guide plate.

Preferably, the reflecting and scattering portion may include a notch that has a reflecting and scattering surface that reflects the light from the light source that is incident from the end surface, and is formed in the light guide plate.

A configuration may be adopted in which the reflecting and scattering portion includes a notch that has a V-shaped cross-section, and has a reflecting and scattering surface on the light source side.

A configuration may be adopted in which the reflecting and scattering portion includes a conical or pyramidal notch.

Preferably, an inclination angle of the reflecting and scattering surface to the light guide plate may be greater than or equal to 40 degrees, and less than or equal to 60 degrees.

In the display apparatus of the present invention, a configuration may be adopted in which a back reflector is provided on the other surface side of the light guide plate, and the reflecting and scattering portion is adapted so as to make reflected light be emitted from the one surface side via the back reflector.

A configuration can also be adopted in which the display apparatus may further include a plurality of the light guide plates, and the light guide plates are stacked on each other.

A layer on which a character, a figure, a pattern, an image, or a combination thereof is printed may be formed on the other surface side of a light guide body.

A lighting window of the present invention is a lighting window using the above display apparatus as a light transmission part that allows an outside light to be transmitted and introduced therethrough.

A display apparatus of the present invention includes a transparent light guide plate; at least one light source provided on at least one end surface of the light guide plate; and a mask or a lens array as a parallax barrier provided on one surface side of the light guide plate. The light guide plate is formed of a plurality of reflecting and scattering portions having reflecting and scattering surfaces that reflect and scatter a light from the light source that is incident from the end surface and emit the reflected light from the one surface side.

Preferably, the reflecting and scattering portion may be a concave portion, a convex portion, or a combination thereof that is formed in the light guide plate.

Preferably, the reflecting and scattering portion may include a notch that has a reflecting and scattering surface that reflects light from the light source that is incident from the end surface, and is formed in the light guide plate.

Preferably, the reflecting and scattering portion may include a notch that has a reflecting and scattering surface on the light source side, and has a V-shaped cross-section.

Preferably, the reflecting and scattering portion may include a conical or pyramidal notch that has a reflecting and scattering surface on the light source side.

Preferably, an inclination angle of the reflecting and scattering surface to the light guide plate may be greater than or equal to 40 degrees and less than or equal to 60 degrees.

Preferably, a back reflector may be provided on the other surface side of the light guide plate, and the reflecting and scattering portion is adapted so as to make reflected light be emitted from the one surface side via the back reflector.

Preferably, the display apparatus of the present invention may further include a plurality of the light guide plates, and the light guide plates are stacked on each other.

In the display apparatus of the present invention, preferably, a layer on which a character, a figure, a pattern, an image, or a combination thereof is printed may be formed on the other surface side of a light guide body.

The lighting window of the present invention may be a lighting window using the above display apparatus as a light transmission part that allows outside light to be transmitted and introduced therethrough.

A display apparatus of the present invention includes a transparent light guide plate; at least one light source provided on at least one end surface of the light guide plate; and a mask provided on one surface side of the light guide plate. The light guide plate is formed of a plurality of reflecting portions having reflecting surfaces that reflect a light from the light source that is incident from the end surface and emit the reflected light from the one surface side. The mask is adapted to make a reflected light beam from a reflecting portion for one eye among the plurality of reflective portions visually recognized using one eye of an observer, to make a reflected light beam from a reflective portion for the other eye visually recognized using the observer's other eye, and to make the reflected light beams stereoscopically recognized due to a binocular parallax.

Preferably, the reflecting portion may include a notch that is formed in the light guide plate.

Preferably, an inclination angle of the reflecting surface to the surface of the light guide plate may be greater than or equal to 40 degrees and less than or equal to 60 degrees.

In the display apparatus of the present invention, a configuration may be adopted in which a back reflector is provided on the other surface side of the light guide plate, and the reflecting portion is adapted so as to make reflected light be emitted from the one surface side via the back reflector.

A configuration may also be adopted in which the display apparatus can further include a plurality of the light guide plates, and the light guide plates are stacked on each other.

Since the display apparatus of the present invention includes the light guide plate, the light from the light source can be reflected by the reflecting surface of the reflective portion, and can be emitted from one surface side. For this reason, reflected light having sufficient strength is obtained. Hence, an extremely bright image is obtained irrespective of using the mask.

Additionally, since display is performed by the reflected light, light, such as a backlight, is unnecessary and a lower profile is possible.

DETAILED DESCRIPTION OF THE PREFERRED EMBODIMENTS

Figure 1:
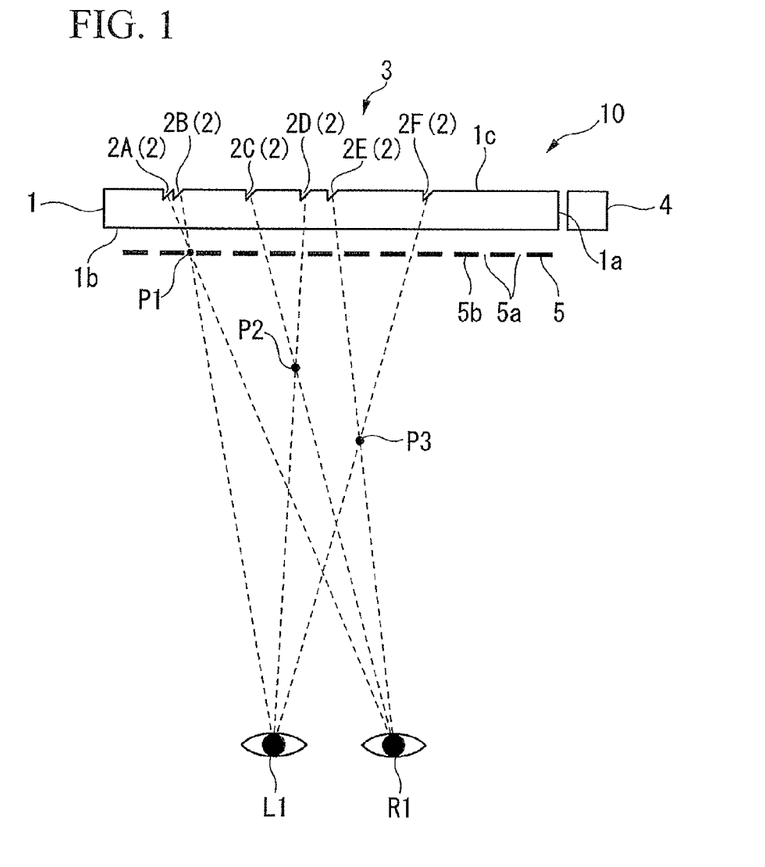
FIG. 1 is a configuration diagram schematically showing a first embodiment of the display apparatus of the present invention.
Figure 2:
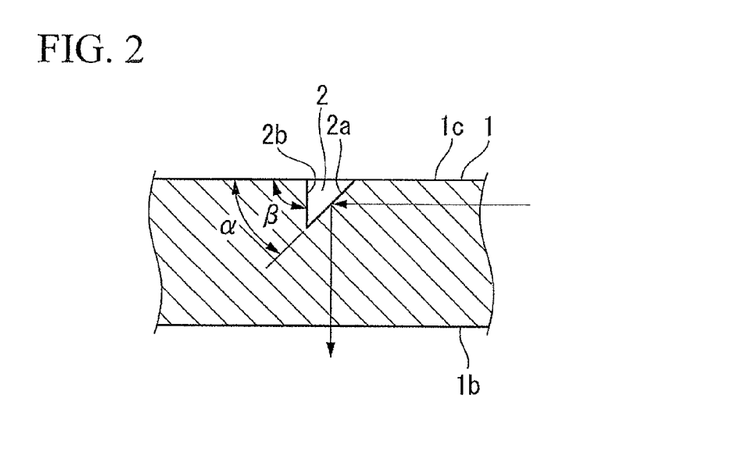
FIG. 2 is an enlarged cross-sectional view of main parts of the display apparatus.

FIGS. 1 and 2 show a display apparatus 10 that is a first embodiment of the display apparatus of the present invention. FIG. 1 is a configuration diagram schematically showing the display apparatus 10, and FIG. 2 is an enlarged cross-sectional view of the main parts of the display apparatus 10.

As shown in FIG. 1, the display apparatus 10 includes a transparent light guide plate 1, a light source 4 provided on an end surface 1a of the light guide plate 1, and a mask 5 (parallax barrier) provided so as to face one surface side (a front surface 1b side) of the light guide plate 1.

As the light source 4, an LED, an LD (laser diode), or the like can be used. For example, the light source can be constituted of a plurality of LEDs that is arranged along the end surface 1a of one side of the light guide plate 1. The number of light sources 4 to be installed can be one or plural.

The mask 5 has a plurality of slit-shaped openings 5a. The openings 5a can be formed parallel to each other at predetermined intervals. In the mask 5, the openings 5a and light-shielding portions are alternately aligned at regular pitches.

As the mask 5, a mask obtained by forming black light-shielding portions 5b on the surface of a transparent resin film by printing or the like can be used.

The mask 5 is arranged at a predetermined distance from the light guide plate 1 substantially parallel to the light guide plate 1.

As the light guide plate 1, arbitrary transparent materials may be used, for example, plates made of synthetic resins, such as an acrylic resin, a polycarbonate resin, a silicone resin, and a cyclopolyolefin resin, a glass plate, and the like are used. Among these, an acrylic plate is preferable in terms of transparency, easiness of processing, or the like.

The thickness of the light guide plate 1 can be 0.5 mm to 10 mm, for example.

In addition, the term "transparent" in the present invention means having light permeability to such a degree that reflected light from a reflective portion 2 can be visually recognized. In addition, both surfaces (the front surface 1b and a rear surface 1c) of the light guide plate 1 are parallel to each other.

A display unit 3 including a plurality of reflective portions 2 (reflecting and scattering portions) is formed on the rear surface 1c (the other surface) of the light guide plate 1.

As shown in FIG. 2, the reflective portion 2 is a notch formed in the rear surface 1c, and has a reflecting surface 2a (reflecting and scattering surface) that reflects light, which is emitted from the light source 4 and is incident from the end surface 1a, to the front surface 1b side.

In the embodiment shown in FIG. 2, the reflective portion 2 has a cross-section that becomes a triangle that has the reflecting surface 2a as an oblique side. The shape of the reflective portion 2 can also be called a V-shaped cross-section. The reflecting surface 2a is a surface nearer the light source 4 in two surfaces that constitute the reflective portion 2.

The reflective portion may have a structure that is formed in the light guide plate to reflect light from the light source to the front surface side. The configuration of the reflective portion is not limited to the illustrated embodiment, for example, and can be a concave portion, a convex portion, or a combination thereof.

When light enters the light guide plate from one direction, if the area in plan view is the same, the reflective portion with such a V-shaped cross-sectional shape can efficiently reflect light in a perpendicular direction. Moreover, the right-angled-triangular cross-sectional shape (the inclination angle of the reflecting surface is about 45 degrees to a surface (for example, the rear surface 1c shown in FIG. 2) in which a reflective portion is formed), and an opposed surface (a surface shown by a sign 2b in FIG. 2) of the reflecting surface is perpendicular to the surface in which the reflective portion is formed) as in the illustrated embodiment can most efficiently reflect light in the perpendicular direction.

On the other hand, when light enters the light guide plate from a plurality of directions, the reflective portion desirably has a conical shape or a pyramidal shape, or a concave portion that is a portion thereof.

When it is necessary to be easily recognized visually from a lower angle as well as from near the perpendicular direction, it is effective to form the reflective portion in a curved concave shape, such as a hemisphere, or to form the reflecting surface as a roughened surface by sandblasting or the like.

The reflective portion may be, for example, a notch with a cross-sectional shape, such as a polygon more than a quadrangle (for example, trapezoid) and a sector. Additionally, the reflective portion may be a through-hole that is formed in the light guide plate, or may be a space portion formed in the light guide plate. Additionally, a structure in which a portion of a convex portion formed on the light guide plate is a reflecting and scattering surface can also be adopted. Moreover, a structure in which a convex portion (a reflecting and scattering portion) is formed in a concave portion formed in the light guide plate may be adopted.

Although the shape of the reflective portion 2 in plan view is not particularly limited, the shape of the reflective portion may be a polygon, such as a rectangle, a triangle, and a pentagon, a circular shape, an elliptical shape, or the like. Additionally, the reflective portion 2 can also be formed in the shape of a dot, and can also be formed in the shape of a line.

If the inclination angle (the angle α shown in FIG. 2) (angle to the rear surface 1c) of the reflecting surface 2a to the light guide plate 1 is too small, the inclination angle of outgoing light becomes small, and the visibility of the reflective portion 2 when the display apparatus 10 is seen from the front deteriorates. Additionally, if the inclination angle α is too large, the incidence angle of light exceeds a critical angle, the ratio of light that is transmitted through the reflecting surface 2a increases. Therefore, the reflection efficiency of light declines, and the use efficiency of light becomes low.

For this reason, the inclination angle α of the reflecting surface 2a is preferably 40 degrees or more and 60 degrees or less, and more preferably 45 degrees or more and 55 degrees or less. By setting the inclination angle α within the above range, the reflection efficiency of light can be made high, the reflected light can be made to be emitted perpendicularly to the front surface 1b or at an angle near the perpendicular direction, so that the visibility of the reflective portion 2 can be enhanced.

If the inclination angle (the angle β shown in FIG. 2) of the surface 2b farther from the light source 4 in the two surfaces that constitute the reflective portion 2 is set to 100 or less degrees, this is preferable since the area of the reflective portion 2 in plan view can be made small.

Figure 7:
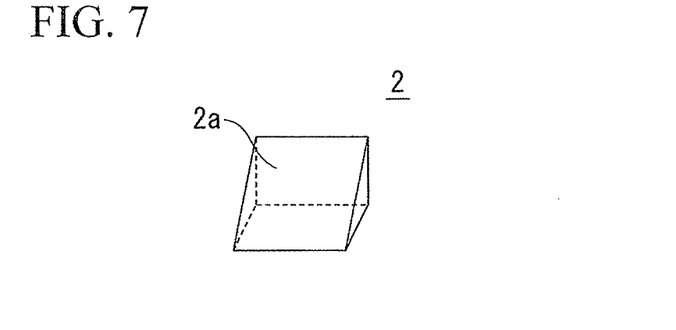
FIG. 7 is a perspective view schematically showing a reflective portion.

FIG. 7 is a perspective view of the reflective portion 2 shown in FIG. 2.

FIGS. 8 to 11 show modifications of the reflective portion 2, and all the modifications include a notch formed in the rear surface 1c of the light guide plate 1.

Figure 8:
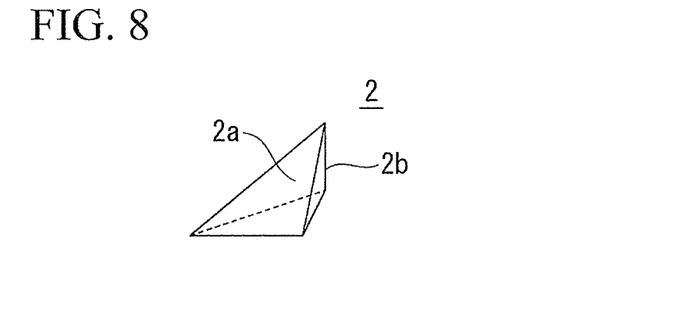
FIG. 8 is a perspective view schematically showing a modification of the reflective portion.
Figure 9:
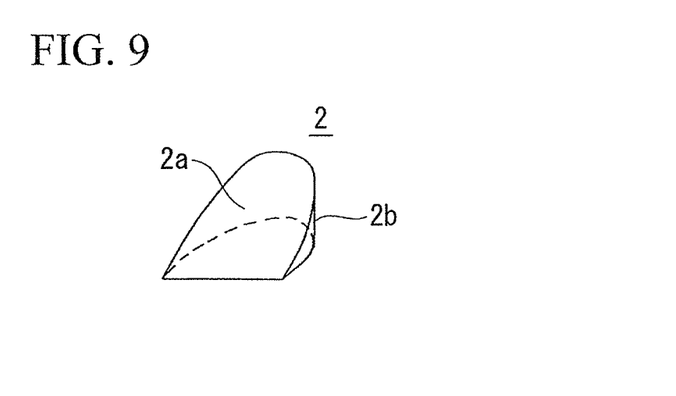
FIG. 9 is a perspective view schematically showing another modification of the reflective portion.

The reflective portions 2 of FIGS. 8 and 9 have a V-shaped cross-section, and the reflective portion 2 of FIG. 8 has a pyramidal shape (a triangular pyramidal shape in the illustrated embodiment) that is tapered in the depth direction (upward in the drawing). One of lateral surfaces of this reflecting portion becomes the reflecting surface 2a that is an inclined surface. The reflective portion 2 of FIG. 9 is a shape including a curved surface 2b that is a portion of a cylinder that has an axis perpendicular (or inclined to the rear surface 1c) to the rear surface 1c of the light guide plate, and a reflecting surface 2a that is a substantially semi-elliptical plane that is inclined with respect to the axis.

Figure 10:
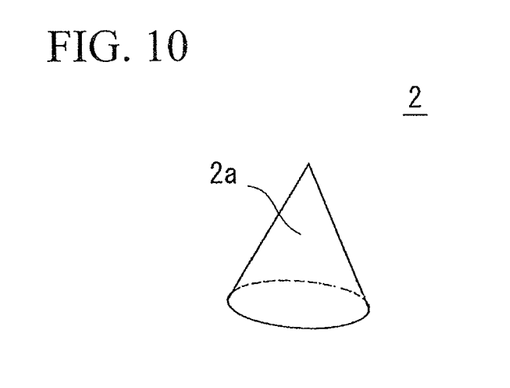
FIG. 10 is a perspective view schematically showing still another modification of the reflective portion.

The reflective portion 2 of FIG. 10 has a conical shape that is tapered in the depth direction (upward in the drawing), and the lateral surface thereof becomes the reflecting surface 2a.

Figure 11:
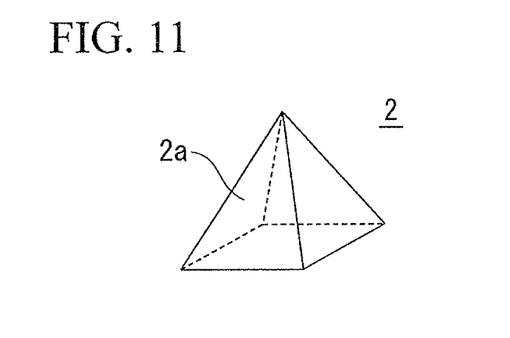
FIG. 11 is a perspective view schematically showing a still further modification of the reflective portion.

The reflective portion 2 of FIG. 11 has a pyramidal shape (a quadrangular pyramidal shape in the illustrated embodiment) that is tapered in the depth direction (upward in the drawing). In the reflective portion 2, one of lateral surfaces becomes the reflecting surface 2a. In addition, the reflective portion 2 may have pyramidal shapes (for example, a triangular pyramid, a pentagonal pyramid, a hexagonal pyramid, and the like) other than a quadrangular pyramid.

The reflective portions 2 of FIGS. 8 to 11 are formed of the reflecting surfaces 2a directed to the light source 4.

Although the display unit 3 is not particularly limited if the display unit includes a plurality of reflective portions 2, a configuration in which the reflective portions 2 are arranged so as to form a predetermined image is preferable. For example, a character, a symbol, a figure, a pattern, or a combination of two or more among these is possible.

As shown in FIG. 1, the positions of the reflective portions 2 are set to positions that are observable using the right eye R1 (one eye) or the left eye L1 (the other eye) through the openings 5a of the mask 5.

One of the reflective portions 2 is visually recognized using any one of the observer's right eye R1 and left eye L1, and one of the other reflective portions 2 is visually recognized using the other of the right eye R1 and the left eye L1, whereby the reflected light is visually recognized as a stereoscopic image.

Specifically, as shown in FIG. 1, light from the light source 4 is made incident on the light guide plate 1 from the end surface 1a, is reflected by the reflecting surfaces 2a of the reflective portions 2, and is emitted from the front surface 1b side.

Although a reflective portion 2A for the right eye is observed using the right eye R1 through an opening 5a, the reflective portion is not observed using the left eye L1 due to a light-shielding portion 5b.

Although a reflective portion 2B for the left eye is not observed using the right eye R1 due to the light-shielding portion 5b, the reflective portion is observed using the left eye L1 through the opening 5a.

Similarly, reflective portions 2C and 2E for the right eye are observed using only the right eye R1, and reflective portions 2D and 2F for the left eye are observed using only the left eye L1.

Since intersection points P1 to P3 between light beams that reach the right eye R1 from the reflective portions 2 for the right eye and light beams that reach the left eye L1 from the reflective portions 2 for the left eye are located at positions apart from the light guide plate 1, the reflected light is recognized as a stereoscopic image due to binocular parallax. In the display apparatus 10, a so-called stereogram display in which light beams from the respective reflective portions 2 are stereoscopically recognized due to binocular parallax becomes possible.

Since the intersection points P1 to P3 have different distances from the light guide plate 1 according to the binocular parallax, the intersection points are observed as an image that has a more stereoscopic effect.

In addition, although the intersection points between light beams from the reflective portions 2 for the right eye and light beams from the reflective portion 2 for the left eye are plural in the illustrated embodiment, even when there is one intersection point, it can be said that the reflected light can be stereoscopically recognized.

Since the display apparatus 10 includes the light guide plate 1, the light from the light source 4 can be made incident on the light guide plate 1 from the end surface 1a, can be reflected by the reflecting surfaces 2a of the reflective portion 2s, and can be emitted from the front surface 1b side. Since the light from the light source 4 is reflected by the reflecting surface 2a and is directed in a substantially constant direction (a direction substantially perpendicular to the front surface 1b in the illustrated embodiment), the strength of the reflected light becomes sufficiently large.

Since an image is formed by this reflected light, an extremely bright image is obtained irrespective of using the mask 5.

Additionally, since display is performed by the reflected light, light, such as a backlight, is unnecessary and a lower profile is possible.

Figure 3:
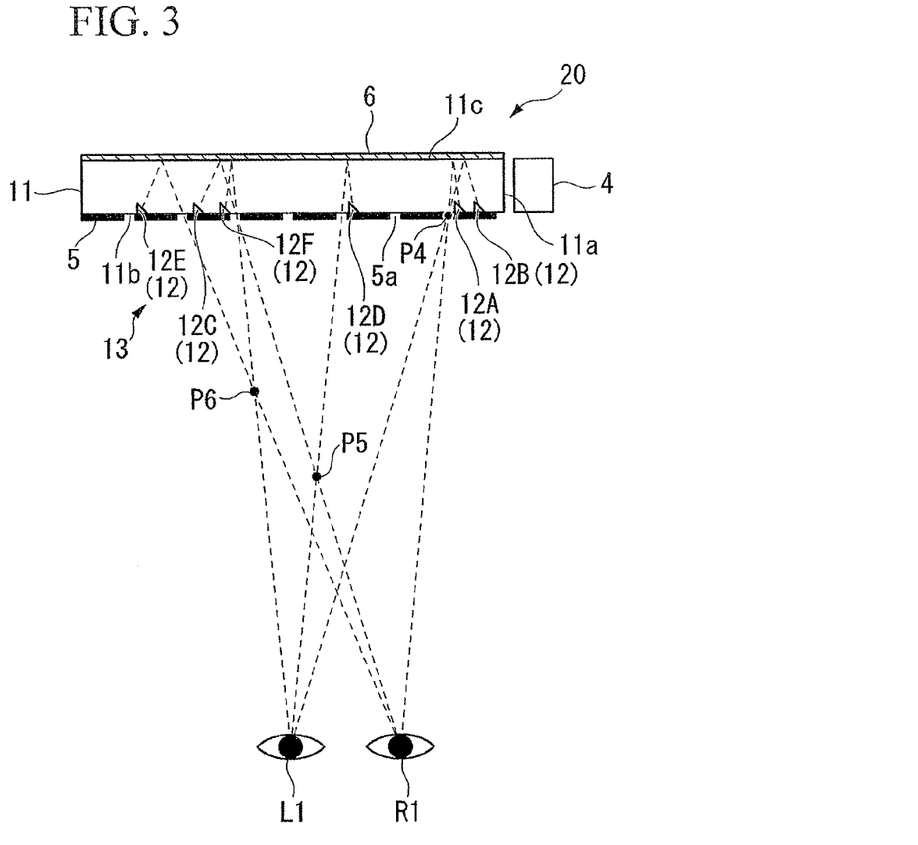
FIG. 3 is a configuration diagram schematically showing a second embodiment of the display apparatus of the present invention.
Figure 4:
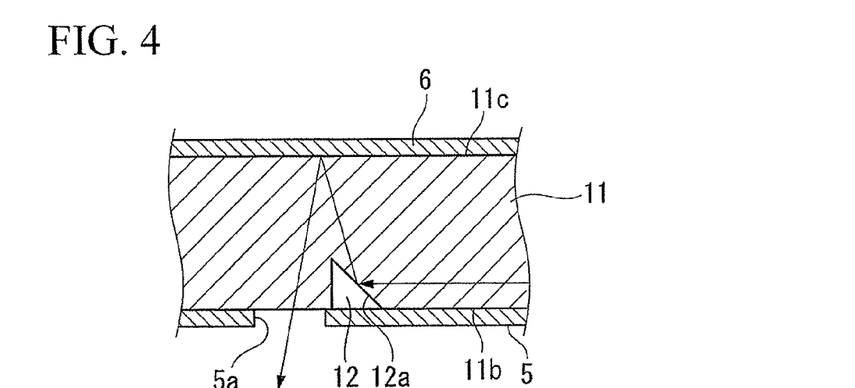
FIG. 4 is an enlarged cross-sectional view of main parts of the display apparatus.

FIGS. 3 and 4 show a display apparatus 20 that is a second embodiment of the display apparatus of the present invention.

In addition, in the following description, components common to those of the display apparatus 10 shown in FIG. 1 will be designated by the same reference numerals, and the description thereof will be omitted.

The display apparatus 20 includes a light guide plate 11, the light source 4 provided on an end surface 11a of the light guide plate 11, the mask 5 on one surface side (a front surface 11b side) of the light guide plate 11, and a back reflecting plate 6 (a back reflector) provided on the other surface side (a rear surface 11c side) of the light guide plate 11.

As shown in FIG. 3, the mask 5 can be provided at a position closer to light guide plate 11, for example, a position adjacent to the front surface 11b of the light guide plate 11, compared to the display apparatus 10 shown in FIG. 1.

A display unit 13 including a plurality of reflective portions 12 is formed on the front surface 11b of the light guide plate 11.

As shown in FIG. 4, the reflective portion 12 is a notch formed in the front surface 11b, and has a reflecting surface 12a that reflects light emitted from the light source 4 and enters the end surface 11a, to the rear surface 11c side. The dimensions of the reflective portion 12 can be made to be the same as that of the reflective portion 2. The inclination angle of the reflecting surface 12a is appropriately set so that the reflected light can pass through an opening 5a. The back reflecting plate 6 is adapted so as to be able to reflect the reflected light from the reflective portion 12.

As shown in FIG. 4, the light from the light source 4 is made incident on the light guide plate 11 from the end surface 11a, and is reflected by the reflecting surface 12a of the reflective portion 12. The reflected light is reflected by the back reflecting plate 6 provided on the rear surface 11c, and is emitted through the openings 5a of the mask 5 from the front surface 11b side. That is, the reflected light from the reflective portion 12 is emitted from the front surface 11b via the back reflecting plate 6.

As shown in FIG. 3, reflective portions 12A, 12C, and 12E for the right eye are observed using only the right eye R1, and reflective portions 12B, 12D, and 12F for the left eye are observed using only the left eye L1. Since intersection points P4 to P6 between light beams from the reflective portions 12 for the right eye and light beams from the reflective portions 12 for the left eye are located at positions apart from the light guide plate 11, the reflected light is recognized as a stereoscopic image due to the binocular parallax. In the display apparatus 20, similarly to the display apparatus 10, a so-called stereogram display in which light beams from the respective reflective portions 2 are stereoscopically recognized due to the binocular parallax also becomes possible.

In the display apparatus 20, similarly to the display apparatus 10 shown in FIG. 1, reflected light having sufficient strength is obtained and an image is formed from this reflected light. Therefore, an extremely bright image is obtained irrespective of using the mask 5. Hence, light, such as a backlight, is unnecessary and a lower profile is possible.

Additionally, in order to obtain a stereoscopic image caused by the binocular parallax, an optical path of a predetermined distance becomes indispensable from a reflective portion 12 that becomes a starting point of reflected light to the mask 5. However, in the display apparatus 20, since the back reflecting plate 6 is provided on the rear surface 11c side, the above optical path can be secured within the light guide plate 11.

Accordingly, the mask 5 can be provided at a position near the light guide plate 11, and a lower profile can be achieved.

Figure 5:
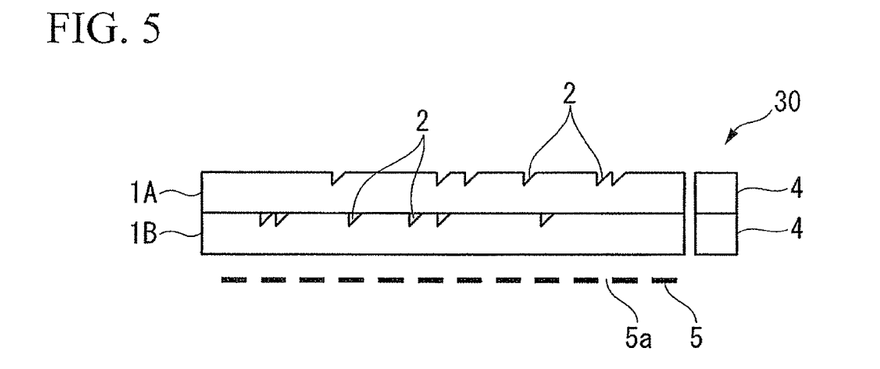
FIG. 5 is a configuration diagram schematically showing a third embodiment of the display apparatus of the present invention.

FIG. 5 shows a display apparatus 30 that is a third embodiment of the display apparatus of the present invention.

The display apparatus 30 includes a first light guide plate 1A, a second light guide plate 1B stacked on the first light guide plate 1A, the light sources 4 and 4 provided on end surfaces of the light guide plate 1A and 1B, and the mask 5 provided on a front surface 1b side of the light guide plate 1A.

The first light guide plate 1A and the second light guide plate 1B can have the same configuration as the light guide plate 1 in the display apparatus 10 shown in FIG. 1.

In the display apparatus 30, since the two light guide plates 1A and 1B are used, an image can be switched by turning on and off the light sources 4 and 4 provided on end surfaces 1A and 1B of the respective light guide plates.

In addition, three or more light guide plates may be used so as to be stacked on each other.

Although the case where a set of two reflective portions perform stereogram display corresponding to one point in a stereoscopic space by a parallax barrier system of two viewing points has been illustrated in the above description, the present invention is not limited thereto.

For example, the present invention can also be applied to a stereogram display apparatus of a parallax barrier system or a lens array system of three or more viewing points.

Additionally, the set of two reflective portions is not needed to be limited as corresponding to one point in a stereoscopic space, and it is sufficient if overall images that are recognized from respective viewing points are recognized as different parallax images.

For example, in the embodiment shown in FIG. 1, the reflective portions 2A, 2C, and 2E for the right eye and the reflective portions 2B, 2D, and 2F for the left eye correspond one to one to each other. However, the reflective portions do not need to have such correspondence relation of 1:1, and an overall image observed from one viewing point and an overall image observed from another other viewing point differ only need to constitute different parallax images.

Hereinafter, an embodiment of a stereoscopic display system to which the present invention can be applied will be described with reference to FIGS. 15 to 17.

Figure 15:
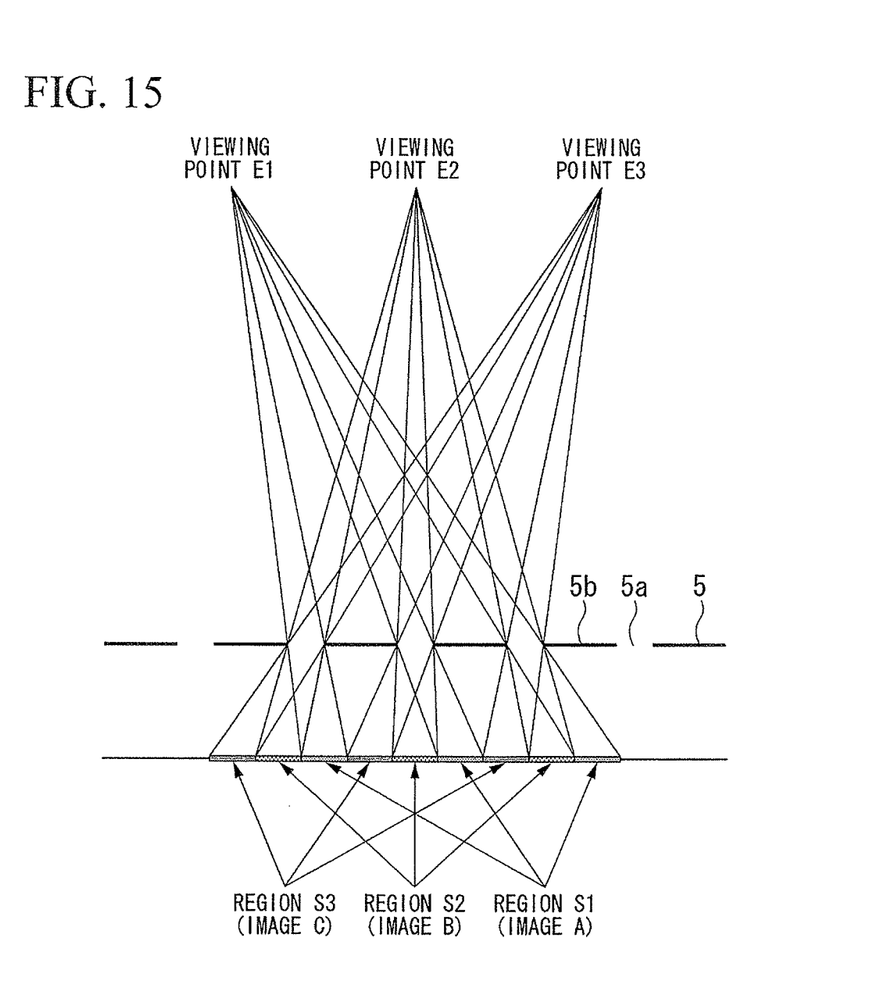
FIG. 15 is a configuration diagram schematically showing an example of a display apparatus of a parallax barrier system.

In the structure shown in FIG. 15, a mask 5 in which slits 5a (openings) and light-shielding portions 5b are alternately formed at fixed repeated pitches is used at a fixed distance from an image surface.

Here, three viewing points E1, E2, and E3, are set, and a region S1 that can be seen from the viewing point E1, a region S2 that can be seen from the viewing point E2, and a region S3 that can be seen from the viewing point E3 are set on the image surface so that these regions do not overlap each other and do not have a gap therebetween. In this case, supposing the distance between a viewing point and the image surface is sufficiently larger compared to the distance between the mask 5 and an image, "Width of each region"≅"Slit width" is satisfied. In the case of the three viewing points, "Width of light-shielding portion"/"Slit width"=(Number of viewing points−1)=2 is satisfied.

Here, images A, B, and C that are intended to be displayed at every viewing point are displayed on the regions S1, S2, and S3, respectively. Specifically, images in other regions are blocked by the light-shielding portions when an image in a certain region is being displayed, only the image in the region is displayed as an intermittent image that is not continuous. However, if the repeated pitch of the openings and the light-shielding portions is made sufficiently small, the image is recognized as an integral image that is continuous.

If viewing points are moved in order of the viewing points E1, E2, and E3, images are recognized so as to change in order of the images A, B, and C.

For this reason, by selecting an image according to a purpose, for example, visual effects, such as changing in which switching to a completely different image is made through movement of the viewing point, morphing in which an image gradually changes through movement of the viewing point, and animation in which a form gradually changes through movement of the viewing point and there seems to be motion, can be obtained.

Although a viewing point has been described as a single point in the description so far, people's eyes are actually a total of two right and left viewing points. An observer sees an object from different angles using his/her respective eyes, and obtains different images (parallax images) at the right and left, so that recognition as a stereoscopic image is caused.

This principle can be used to obtain the effect of stereoscopic viewing, and stereogram display uses this effect.

Figure 16:
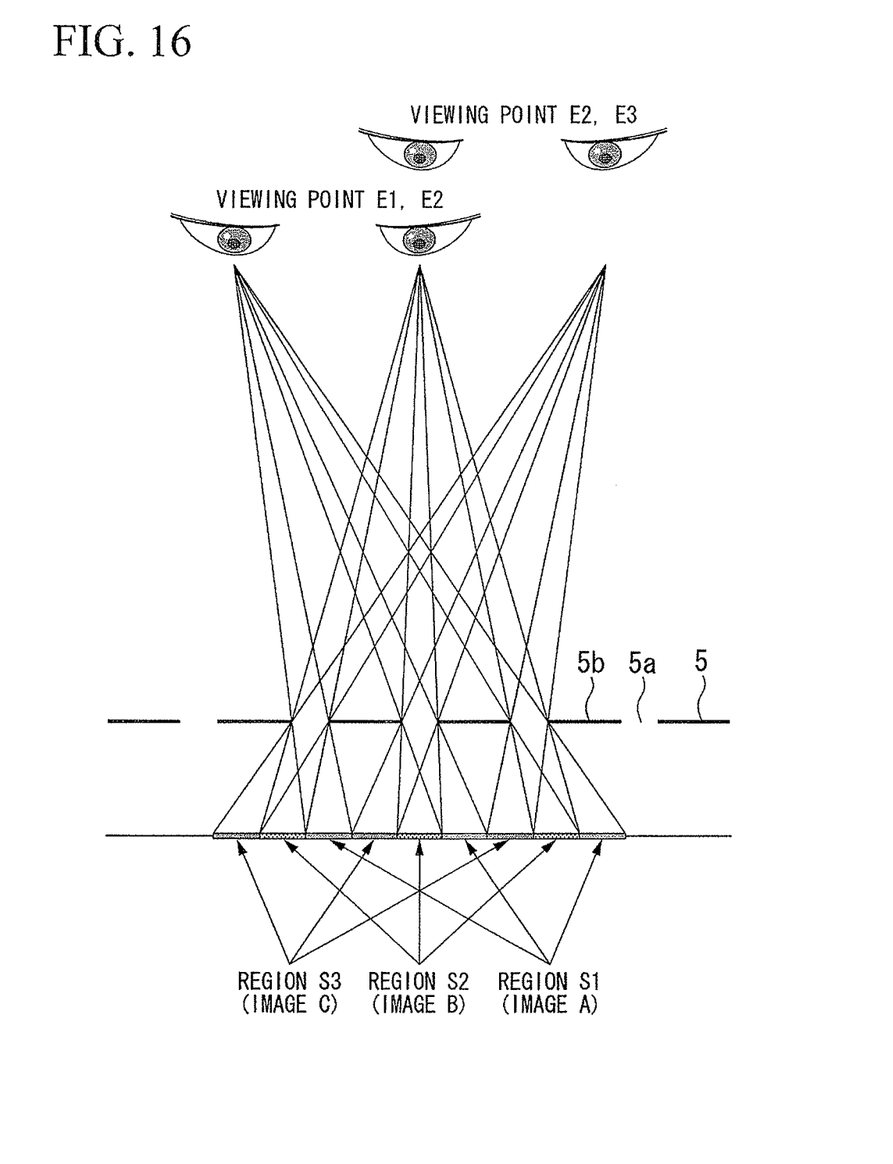
FIG. 16 is a configuration diagram showing schematically an example of a stereogram display apparatus of a parallax barrier system.

For example, as shown in FIG. 16, by setting viewing points such that the viewing point E1 corresponds to the right eye and the viewing point E2 corresponds to the left eye, and setting images such that images to be visually recognized from the positions coincide with actual parallax images, the images are recognized as a stereoscopic image if both eyes are at the positions. By performing a similar setting for the viewing point E2 and the viewing point E3, even when viewing points are moved to E2 and E3, similarly, the images are recognized as a stereoscopic image from different viewing points.

Figure 17:
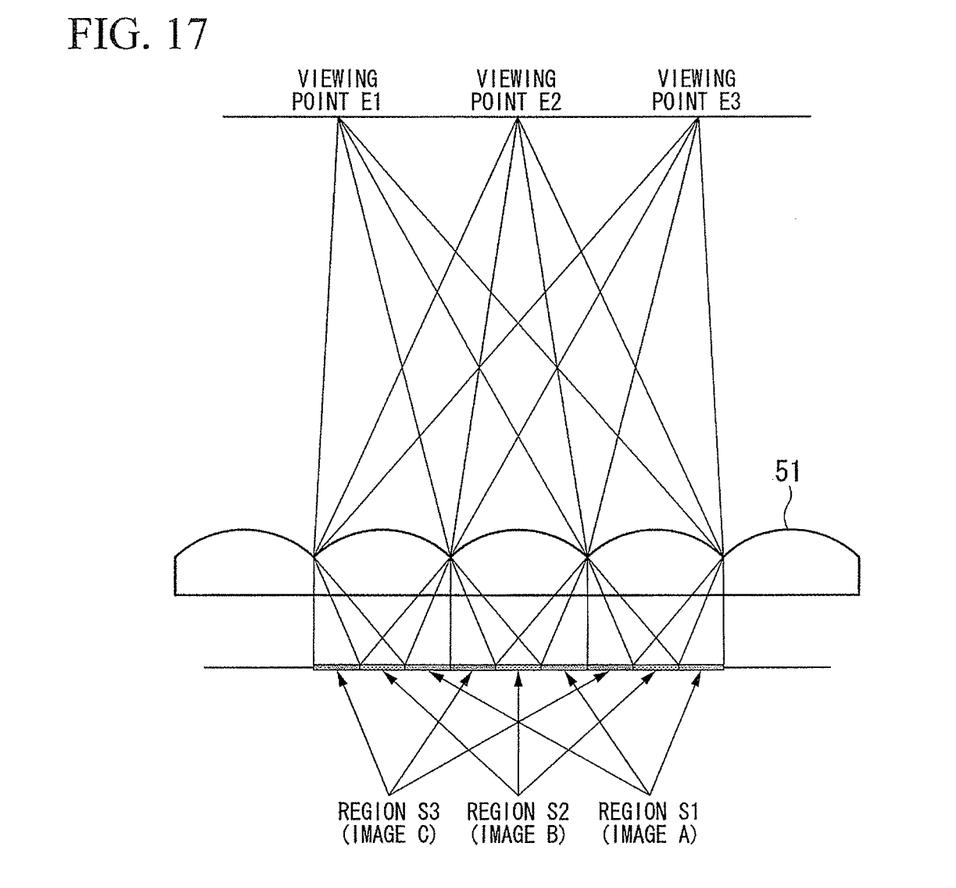
FIG. 17 is a configuration diagram schematically showing an example of a display apparatus of a lens array system.

As shown in FIG. 17, the same effects are obtained even if a lens array 51 with appropriate pitches and focal distances. In the lens array 51, tiny lenses are aligned at regular pitches.

Even in this case, since a region S1 that can be seen from a viewing point E1, a region S2 that can be seen from a viewing point E2, and a region S3 that can be seen from a viewing point E3 are set on an image surface so that these regions do not overlap each other and do not have a gap therebetween, a stereogram or the like can also be similarly formed.

The greatest difference between the parallax barrier system and the lens array system is as follows. That is, in the parallax barrier type, if the number of viewing points increases, the area of the openings becomes relatively small, and outside light does not easily enter. As a result, the image surface becomes dark. Therefore, an internal lighting system using backlight is usually adopted. In contrast, since there is no such a problem in the lens array type, a dedicated light is usually not needed.

Figure 6:
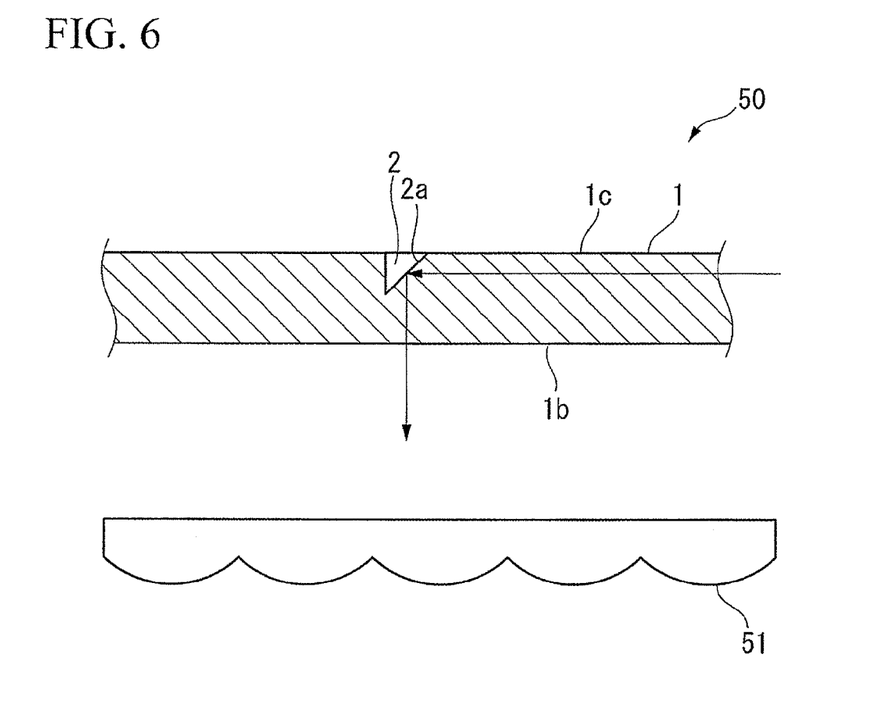
FIG. 6 is a configuration diagram schematically showing a fourth embodiment of the display apparatus of the present invention.

FIG. 6 shows a display apparatus 50 that is a fourth embodiment of the display apparatus of the present invention, and that adopts a lens array system.

In the display apparatus 50, a lens array 51 for forming parallax in light emitted from the front surface of the light guide plate 1 is provided instead of the mask 5. The other components are the same as those of the display apparatus 10 of the first embodiment.

The lens array 51 basically has the same function as the parallax barrier.

For example, as shown in FIG. 17, a region S1 that can be seen from a viewing point E1, a region S2 that can be seen from a viewing point E2, and a region S3 that can be seen from a viewing point E3 are set on an image surface. Since the region S1 can be seen from the right eye and the region S2 can be seen from the left eye by setting viewing points such that the viewing point E1 corresponds to the right eye and the viewing point E2 corresponds to the left eye, the light can be made to be recognized as a stereoscopic image.

In the display apparatus 10 shown in FIGS. 1 and 2, the mask 5 is provided apart from the light guide plate 1. However, the position of the mask 5 is not limited thereto, and may be formed in close contact with the light guide plate.

Figure 12:
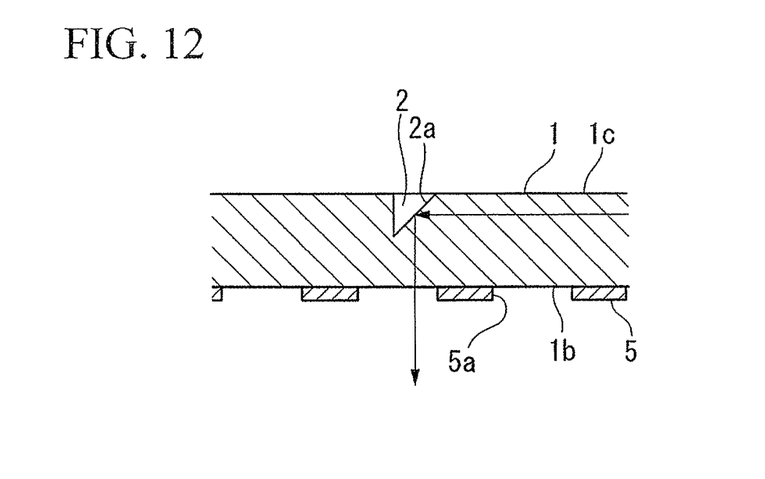
FIG. 12 is an enlarged cross-sectional view of main parts of a modification of the display apparatus.

FIG. 12 shows a configuration in which the mask 5 is formed in close contact with the front surface 1b of the light guide plate 1. In this case, the mask 5 can be formed on the front surface 1b by printing or the like.

Additionally, in the present invention, the function of the lens array can also be provided to the light guide plate 1.

Figure 13:
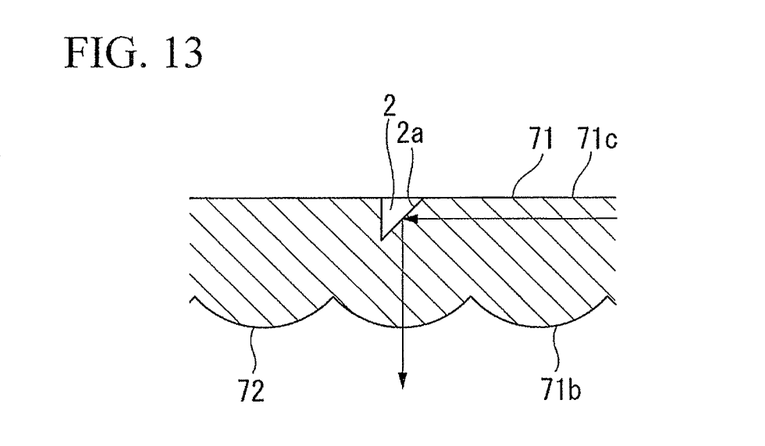
FIG. 13 is an enlarged cross-sectional view of main parts of another modification of the display apparatus.

FIG. 13 shows a light guide plate 71 in which the function of the lens array is provided. In the light guide plate 71, the reflective portions 2 are formed on a rear surface 71c, and, a lens array portion 72 with lens-shaped irregularities is formed on the front surface 71b. The lens array portion 72 has a function as the lens array.

In the present invention, the expression "stereoscopically recognized" according to claim 1 means that images recognized using both eyes can be formed and seen at positions in a space different from a plane where the reflective portions exist originally, and does not mean that a recognized image itself is a stereoscopic image.

For example, even if the recognized image is a plane, a line, or a point, when the image can be formed and seen at a position in a space different from the light guide plate, this is defined as being stereoscopically recognized. This matches general recognition in a stereogram.

Since the display apparatus of the present invention uses the transparent light guide plate, and the lens array that transmits light or the parallax barrier that transmits a portion of light, the display apparatus transmits light at least partially overall.

Accordingly, it is possible to adopt this display apparatus for a window or the like as a light transmission part that allows outside light to be transmitted and introduced therethrough, thereby make the display apparatus, for example, function as a lighting window daytime and function as an illumination at night.

Such a function cannot be provided to a general display apparatus of a parallax barrier system or a display apparatus of a lens array system.

Additionally, since the display apparatus of a lens array system in the present invention is transparent as a whole, it is possible to install a layer on which a character, a figure, a pattern, an image, or a combination thereof is printed, on the back of the light guide plate. Thereby, for example, a display on which these are printed can be visually recognized during non-lighting, for example daytime, and a display caused by luminescence of the light guide plate can be performed during lighting at night. Such a function cannot be provided to a general display apparatus of a parallax barrier system or a display apparatus of a lens array system. As the printing method, for example, screen printing, gravure, or the like is adopted.

In addition, in FIG. 1, the formation direction of the slit-shaped openings 5a is a direction perpendicular to the plane of the sheet, and the incidence direction of light to the light guide plate 1 is perpendicular to the formation direction of the openings 5a. However, the formation direction of the openings 5a is not limited thereto, and can be made arbitrary. For example, the formation direction of the openings may be parallel to the incidence direction of light, or may be an inclined direction to the incidence direction.

Similarly, even in the lens array, the arrangement direction of lenses is not particularly limited, can be made arbitrary.

What is claimed is:

1. A display apparatus comprising:
a transparent light guide plate having a front surface, a rear surface opposed to the front surface, a first end surface, and a second end surface opposed to the first end surface;
at least one light source provided on the first end surface, no light source being provided on the second end surface;
a mask provided at a predetermined distance from the front surface of the transparent light guide plate; and
a plurality of reflecting portions formed on the rear surface, each of the plurality of the reflecting portions having a reflecting surface that reflects a light from the at least one light source that is incident from the first end surface and emits the reflected light from the front surface side,
wherein the reflecting portions are arranged unevenly on the rear surface so as to form a predetermined image, and
wherein the mask is configured to make a reflected light beam from a reflective portion for one eye among the plurality of reflecting portions visually recognized using one eye of an observer, to make a reflected light beam from a reflective portion for the other eye visually recognized using the observer's other eye, and to make the reflected light beams recognized as a stereoscopic image due to a binocular parallax.

2. The display apparatus according to claim 1,
wherein the reflecting portion includes a notch that is formed in the light guide plate.

3. The display apparatus according to claim 2,
wherein an inclination angle of the reflecting surface to the rear surface of the light guide plate is greater than or equal to 40 degrees and less than or equal to 60 degrees.

4. The display apparatus according to claim 1,
wherein a back reflector is provided on the other surface side of the light guide plate, and the reflecting portion is adapted so as to make reflected light be emitted from the one surface side via the back reflector.

5. The display apparatus according to claim 1, further comprising a plurality of the light guide plates,
wherein the light guide plates are stacked on each other.

6. The display apparatus according to claim 1,
wherein a layer on which a character, a figure, a pattern, an image, or a combination thereof is printed is formed on the rear surface side of the light guide body.

7. A lighting window using the display apparatus according to claim 1 as a light transmission part that allows an outside light to be transmitted and introduced therethrough.

* * * * *